United States Patent

[11] 3,596,325

[72] Inventor Karl Hehl
 183 Siedlung, 7291 Lossburg, Wurttemberg, Germany
[21] Appl. No. 792,571
[22] Filed Jan. 21, 1969
[45] Patented Aug. 3, 1971
[32] Priority Apr. 26, 1968
[33] Germany
[31] P 17 78 414.4

[54] MOLD-CLAMPING UNIT FOR SYNTHETIC MATERIAL PROCESSING APPARATUS
 12 Claims, 9 Drawing Figs.
[52] U.S. Cl. .................................................. 18/30 LF,
 18/30 LV, 18/30 JA
[51] Int. Cl. .................................................. B29f 1/00
[50] Field of Search ........................................... 18/30 LA,
 30 LC, 30 LKF, 30 LKM, 30 LKO, 30 LKS, 30
 LM, 30 LT, 30 LV, 30 I, 20 IH

[56] References Cited
 UNITED STATES PATENTS
 3,049,757 8/1962 Hagerborg .................... 18/30 LKO
 3,086,244 4/1963 Hehl ............................. 18/30
 3,449,795 6/1969 Fischbach .................... 18/30

Primary Examiner—H. A. Kilby, Jr.
Attorney—Spencer & Kaye

ABSTRACT: Injection molding apparatus including an injection mold, a synthetic material injecting means and means for clamping two cooperating parts of such mold together. The clamping means is in the form of a formed cylinder block on which a part of the mold is disposed and which encloses the injecting means on at least three sides. The cylinder block has bores which form the cylinders for at least two hydraulic pressing means. Such pressing means serve to move the parts of the mold relative to each other, during a mold-pressing period, by being operably connected to at least one of the mold parts.

Inventor:
Karl Hehl
By: Spencer & Kaye
Attorneys

Inventor:
Karl Hehl
By: Spencer & Kaye
Attorneys

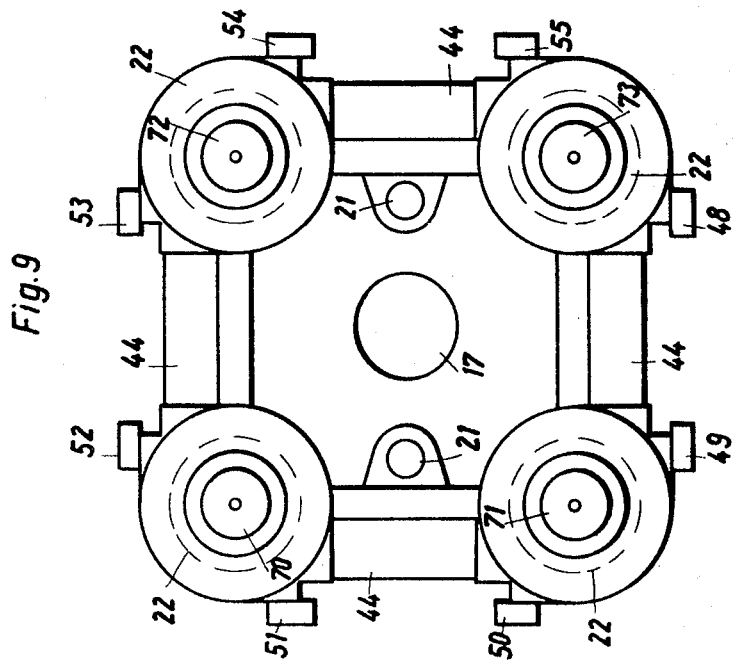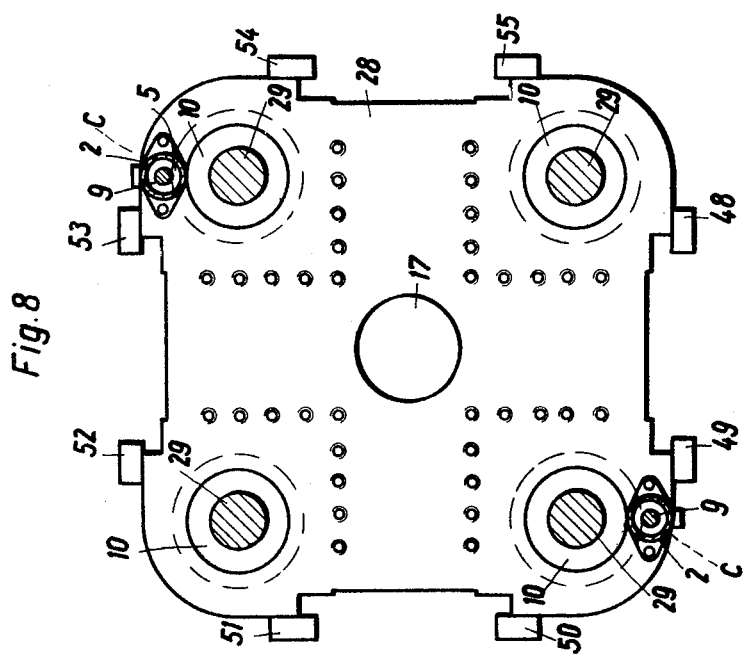

MOLD-CLAMPING UNIT FOR SYNTHETIC MATERIAL PROCESSING APPARATUS

BACKGROUND OF THE INVENTION

The present invention relates to a clamping unit for the casting mold halves or parts of a machine for processing synthetics. More particularly, apparatus is provided for moving the casting mold parts of such a unit away from or toward each other, respectively, with the aid of hydraulic driving means, during a drive period. Moreover, the casting mold parts are held together under pressure, during a pressure period by hydraulic pressing means and the supporting portion of one casting mold part is disposed on the piston rods of the pistons of the hydraulic driving means.

SUMMARY OF THE INVENTION

It is the primary object of the present invention to construct a clamping means, of the type described above, in such a manner that it will be suitably lightweight and compact for all size ranges of the molding apparatus, and that it will be suitable for use where high molding pressures are required.

It is also an object of the present invention to provide a clamping means which is both economically and sturdily constructed.

It is another object of the present invention to construct such a clamping means which can be readily mounted and easily fastened for axial movement to the base of the molding apparatus and which has means for easily connecting at least one additional special unit (e.g. injection unit, core extractor, unscrewing device or the like), with a favorable weight distribution.

This is accomplished, according to the present invention, in that at least two hydraulic means, which are active during the pressure period, are constructed so that their cylinders are in the form of bores provided in a formed block which supports one casting mold part. This piece also encloses, at least on three sides, the injection cylinder of an injection unit which operates transversely to the parting plane of the casting mold.

The formed cylinder block is preferably constructed as a rectangular tube within which the injection cylinder is inserted and which includes bores provided in its walls. Such bores form the cylinders of the hydraulic pressing means.

BRIEF DESCRIPTION OF THE DRAWING

FIG. 8 is a sectional view taken along the line 8-8 of the clamping means according to FIG. 7, without the casting mold.

FIG. 9 is a rear view of the clamping means according to FIG. 6.

DESCRIPTION OF THE PREFERRED EMBODIMENT

Figure 1:
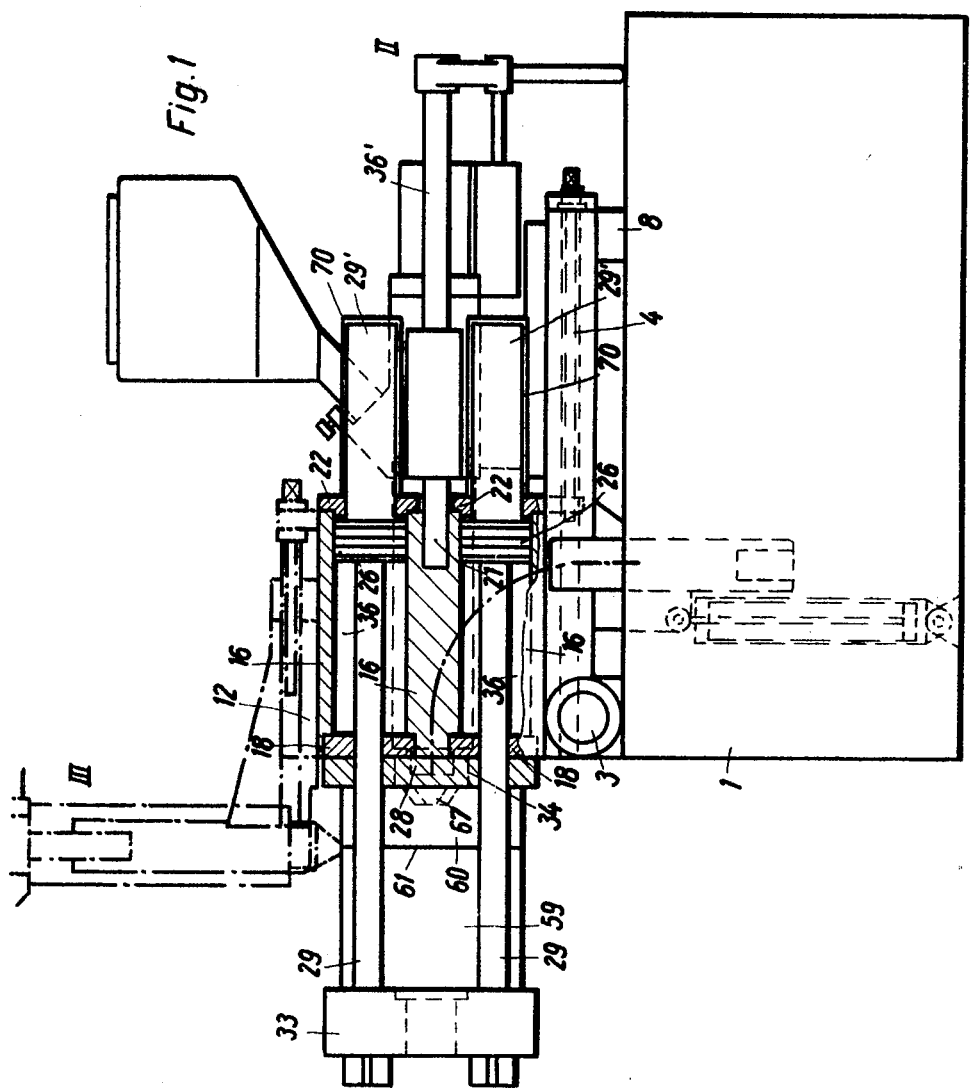
FIG. 1 is a partial sectional view of the clamping means according to the present invention, arranged within an injection-molding apparatus.
Figure 2:
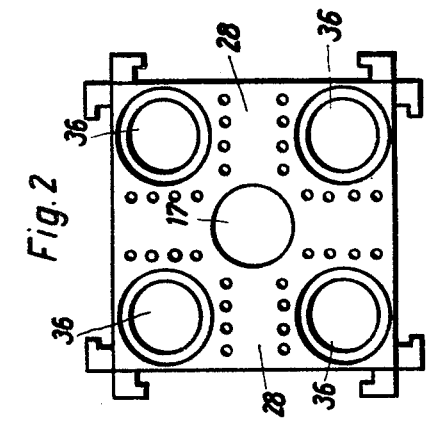
FIG. 2 is a side view of the casting mold of the centrally disposed formed cylinder block of the clamping means which block is constructed in the form of a tube.

Referring to FIG. 1, the centrally disposed core piece in the construction of the clamping means shown is a formed cylinder block in the form of a box-shaped tube 16. The tube 16 is axially displaceably mounted on the base member 1 of the injection molding apparatus and can be pivoted, if required, around an axle 3. Due to its compactness and sturdiness, the tube 16 is well suited to hold a hydraulic pressing means for pressing the mold parts 59, 60 together. The pressing means includes pistons 26, disposed in the drive cylinders 36. Moreover, the tube 16 includes an injection cylinder 67. An additional injection unit (III), illustrated by broken lines, can be mounted on the tube 16 and the casting mold 59, 60 with its associated supporting member 33 can be mounted adjacent thereto. As shown, four cylinders 36 for the pistons 26 are in the form of bores provided in the walls of the tube 16. The tube 16 encloses the injection cylinder 67 of the injection unit II.

Figure 4:
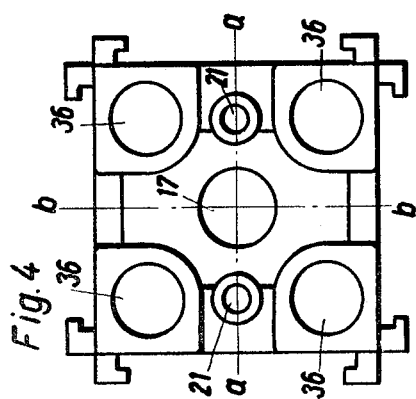
FIG. 4 is a view of the cylinder block according to FIGS. 2 and 3 as seen from the coaxial injection unit II.
Figure 5:
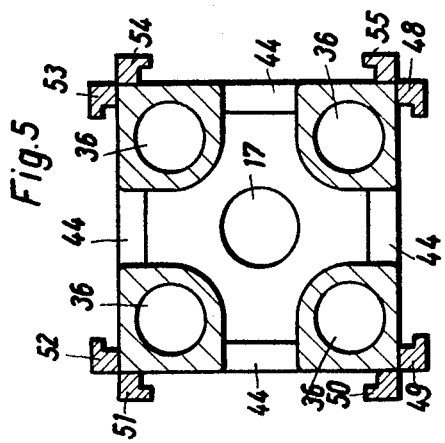
FIG. 5 is a sectional view of FIG. 3 taken along the line 5-5 thereof.

Referring to FIGS. 1 and 9, the supporting struts 36' of the injection unit II are coaxially inserted into additional bores 21, provided in the walls of the tube 16. The tube 16 has a reduced inner diameter at its outlet opening 17. Whereas the outlet opening 17 is circular in order to conform to the shape of the injection cylinder 67 or to the centering means of the casting mold part 60, the cross section of its input opening 15 is in the form of a rectangle with concavely rounded corners, as shown in FIGS. 4 and 9. The apertures 44 in the tube 16 which are disposed within the wall regions containing the cylinder bores 36, serve to make the injection cylinder II accessible and represent a saving of material. As shown in FIG. 1, the injection cylinder II is mounted to operate transversely to the parting plane 61.

Figure 3:
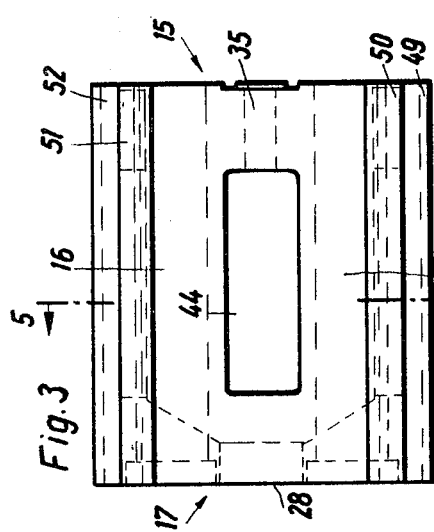
FIG. 3 is a side view of the cylinder block according to FIG. 2.
Figure 6:
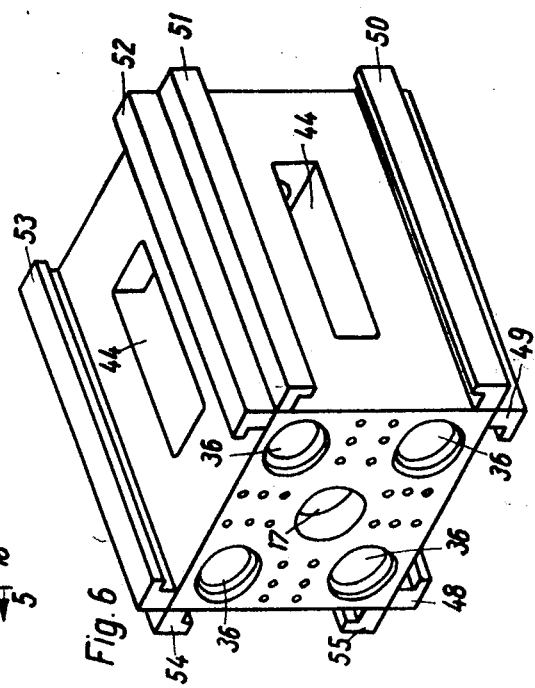
FIG. 6 is a perspective view of the centrally disposed cylinder block, which is in the form of a tube, of the clamping means according to the present invention.

Referring to FIGS. 1 and 3, a special mold clamping plate 34 is disposed in front of the surface 28. On the other hand, the tube 16 is so constructed that the frontal face 28 can serve directly as the clamping surface for the casting mold part 60. The cylinder bores 36 are covered by front cylinder cover members 18, and rear cylinder cover members 22.

Connecting elements arranged in pairs 48,49; 50,51; 52,53 and 54,55 are in the form of angular ledges and are fastened to the four outer planar surfaces of the rectangular or box-shaped tube 16. The connecting elements 48—55 serve to connect other associated special units, particularly injection units, to the tube 16. A pair of connecting elements, for example 48,49 serves to hold and axially guide the rectangular tube 16 in the apparatus base member 1. Thus, for example, a frame 12 is mounted for displacement in the connecting elements 52,53, shown in FIGS. 4—6, 8 and 9, for displacement in the direction in which the mold is closed, as shown in FIG. 1. The frame 12 itself, includes means for connecting at right angles the injection unit III, illustrated by broken lines in FIG. 1. The displacement of frame 12 together with the injection unit III is accomplished by means of a threaded spindle.

The tube 16 which exhibits two planes of symmetry a-a and b-b is disposed for axial displacement on supporting rods 4 which, themselves, are connected to the apparatus base member 1 via an axle 3. The axial displacement of the tube 16 and, thus, of the clamping means occurs with the aid of a threaded spindle which is supported in a transverse arm 8 of the supporting rods 4.

The piston rods 29 are respectively brought through holes provided in the front cylinder covers 18. The free ends of piston rods 29 are held by the movable support member of the casting mold part 59. On the side of pistons 26, facing away from the casting mold, the extended portions 29' of the piston rods 29 are brought through bores provided in the rear cylinder covers 22, and are covered by their protective sheaths 70, as shown in FIGS. 7 and 9.

Figure 7:
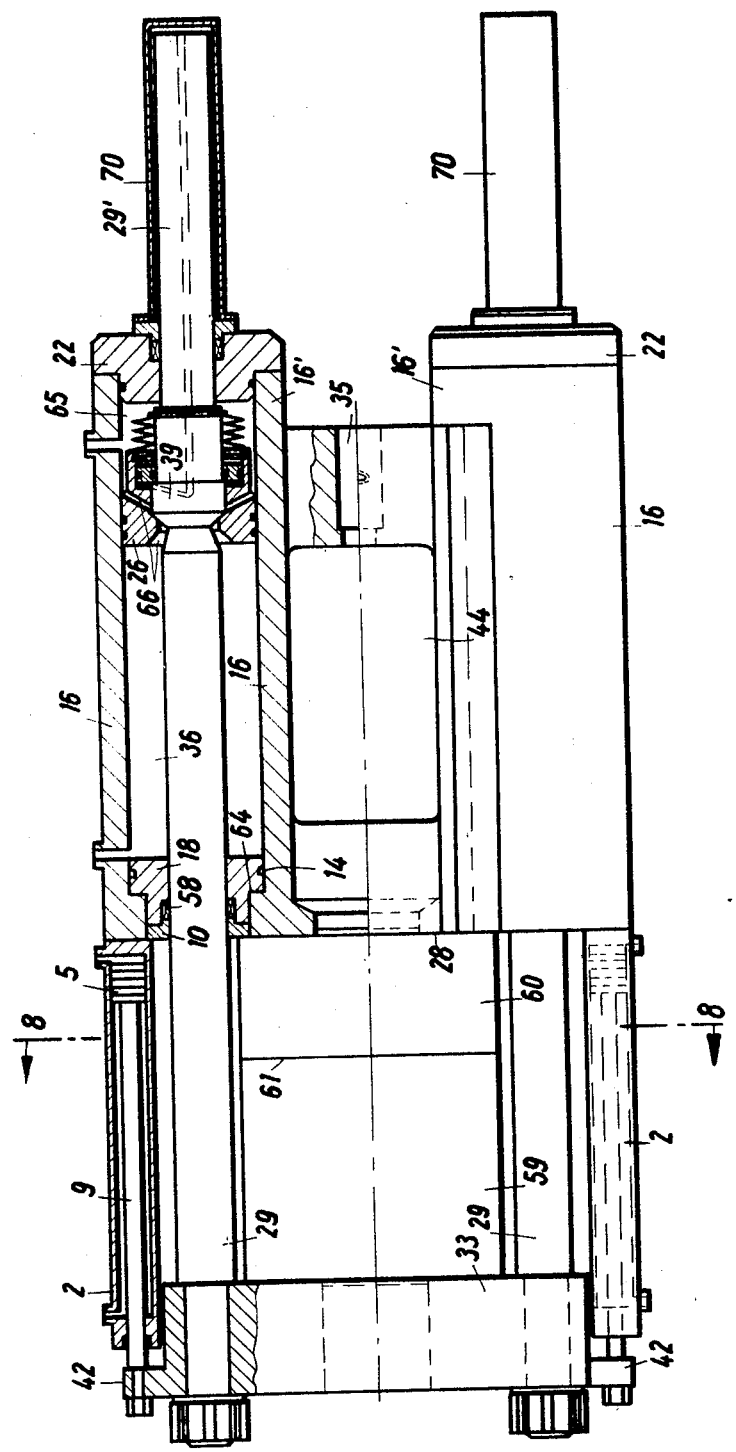
FIG. 7 is a partial longitudinal view of another embodiment of the clamping means, according to the present invention.

The embodiment, according to FIGS. 7—9, has the following characteristics:

The tube 16 is arranged to have one of its ends nearer the injection mold than the other. Moreover, the tube 16, formed as a unit includes extensions 16' which protrude from each of the pressing means cylinders 36 at the end of said tube away from the injection mold. Each such extension 16' forms a free end of each cylinder 36. The free ends are covered by the cylinder cover members 22. By this construction, it is possible to achieve a substantial saving in material as well as a reduction in weight.

In order to realize a clamping surface 28 which is as free and as sturdy as possible, the cylinder bores 36 are covered on the side of the casting mold 59, 60 with additional cylinder cover members 18. The cover members 18 are arranged abuttingly against annular shoulders 64, provided at the end nearest the injection mold of an associated cylinder 36, as shown sectionally in FIG. 7. The cylinder cover members 18 are provided with a seal 14 and packing 58 and are separated from the clamping surface 28 by cover plates 10. As can be seen in FIGS. 7 and 8, the clamping surface 28 is partially formed by an end surface of tube 16 and by the cover plates 10.

As shown in FIGS. 7 and 8, the casting mold parts 59, 60 are moved relatively rapidly toward or away from each other by at least two hydraulic driving means provided for this purpose including cylinders 2, pistons 5 and driving pistons 9. These hydraulic driving means have to exert only a relatively small force to move the mold halves 59,60 relative to each other. Each hydraulic driving means is supported at one end by the tube 16 and at the other end by abutments 42 on the support member 33 of the casting mold part 59 disposed on the piston rods 29. Moreover, the two hydraulic driving means are diagonally disposed with respect to tube 16 in a plane c–c which extends obliquely to the clamping means.

During the injection period, the casting mold parts 59, 60 are pressed together with great force by the hydraulic pressing means cylinders 36 and pistons 26. The pistons 5 of the hydraulic driving means are connected with pistons 26 via piston rods 9, the support member 33 and the piston rods 29 and form a moving unit therewith. When the hydraulic driving means including cylinders 2, pistons 5 and piston rods 9 are operational, the pistons 5 and piston rods 9 are moved and open or close the mold halves 59, 60. At the same time, the pistons 26 are moved without performing any work. It is, therefore, preferred to ensure that the oil disposed in chambers 36 during the mold driving periods can flow into and out of chambers 65, as appropriate, via at least one channel 66 through piston 26. A valve 39 is also provided in each piston 26 and associated with the channel 66. The valve 39 is controlled to block the channel 66 during the mold-pressing period, since during this period the pistons 26 are charged in order to produce the required pressure. On the other hand, the valve 39 is controlled to unblock channel 66 during mold driving periods.

It will be understood that the above description of the present invention is susceptible to various modifications, changes and adaptations.

I claim:
1. Apparatus for injection molding comprising in combination:
   a. injection mold having at least two cooperating parts which define a parting plane and a supporting member on which a first one of said mold parts is disposed;
   b. means for injecting synthetic material into said injection mold having an injection cylinder and operating transversely to said parting plane;
   c. means for clamping said pair of mold parts together including:
      1. a cylinder block on which a second one of said two mold parts is disposed and having the form of a box-shaped tube with planar outer surfaces between its ends, said injection cylinder being inserted through said tube so as to be enclosed on at least three sides;
      2. at least two hydraulic pressing means for moving said first mold part with respect to said second mold part during a pressing period, each of said pressing means having a cylinder in the form of a bore provided in the walls of said tube, a piston disposed in said cylinder and a piston rod connected to said piston and to said supporting member on which said first mold part is disposed.

2. Apparatus for injection molding as defined in claim 1, wherein apertures are provided in the tube walls between the pressing means cylinder bores.

3. Apparatus for injection molding as defined in claim 2 wherein one of the ends of said tube is nearer the injection mold than the other and extensions protrude from each of said pressing means cylinders at the end of said tube further from said injection mold, each extension forming an end for its respective pressing means cylinder bore and a cover member provided at each such end.

4. Apparatus for injection molding as defined in claim 3 wherein the end of said tube facing said injection mold defines a clamping surface on which the second one of said two mold parts is disposed.

5. Apparatus for injection molding as defined in claim 4 further comprising at least two hydraulic driving means for rapidly moving said first mold part with respect to said second mold part during a mold driving period, said hydraulic driving means each including a driving cylinder having one end supported by said tube and another end connected to said supporting member for said first mold part.

6. Apparatus for injection molding as defined in claim 5 wherein each of said pressing means cylinder bores includes an annular shoulder provided at its end nearest said injection mold and an additional cover member arranged abuttingly against said annular shoulder.

7. Apparatus for injection molding as defined in claim 6 further comprising connecting elements disposed on at least one of said planar outer surfaces to which a further part of said apparatus can be connected.

8. Apparatus for injection molding as defined in claim 7 wherein said further part is an additional means for injecting synthetic materials into the parting plane of said mold parts and which includes a frame, said frame being mounted on said connecting elements for movement in the direction of said first mold part with respect to said second mold part.

9. Apparatus for injection molding as defined in claim 7 wherein said further part is a base member on which said tube is mounted and said connecting elements serve to guide said tube on said base member.

10. Apparatus for injection molding as defined in claim 9 wherein said base member includes an axle and supporting rods pivotably connected on said axle, said tube being axially displaceably mounted on said base member via said connecting elements being connected to said supporting rods.

11. Apparatus for injection molding as defined in claim 10 wherein said injecting means includes supporting struts and said tube includes additional bores provided therein for receiving said supporting struts, each of said supporting struts being coaxially inserted into one of said additional bores.

12. Apparatus for injection molding as defined in claim 11 wherein each of said hydraulic means pistons and cylinders together define two chambers, one on each side of said pistons, said chambers being connected with each other via at least one channel provided through each of said pistons, and a valve member disposed in each of said pistons associated with each said channel, said valve member being controlled to unblock said channel during operation of said hydraulic driving means and being controlled to block said channel during operation of said hydraulic pressing means.